(12) United States Patent
Avery et al.

(10) Patent No.: US 10,380,353 B2
(45) Date of Patent: *Aug. 13, 2019

(54) DOCUMENT SECURITY IN ENTERPRISE CONTENT MANAGEMENT SYSTEMS

(71) Applicant: International Business Machines Corporation, Armonk, NY (US)

(72) Inventors: Kenytt D. Avery, Newport Beach, CA (US); Jean-Marc Costecalde, Irvine, CA (US); David B. Harnick-Shapiro, Costa Mesa, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/559,481

(22) Filed: Dec. 3, 2014

(65) Prior Publication Data

US 2015/0220754 A1    Aug. 6, 2015

Related U.S. Application Data

(63) Continuation of application No. 14/172,029, filed on Feb. 4, 2014.

(51) Int. Cl.
| | |
|---|---|
| *G06F 21/00* | (2013.01) |
| *G06F 21/60* | (2013.01) |
| *G06F 16/21* | (2019.01) |
| *G06F 21/62* | (2013.01) |

(52) U.S. Cl.
CPC ............ *G06F 21/602* (2013.01); *G06F 16/21* (2019.01); *G06F 21/6218* (2013.01)

(58) Field of Classification Search
CPC ........................ G06F 21/602; G06F 17/30289

USPC ......................................................... 713/189
See application file for complete search history.

(56) References Cited

U.S. PATENT DOCUMENTS

| | | |
|---|---|---|
| 6,321,201 B1 | 11/2001 | Dahl |
| 6,963,980 B1 | 11/2005 | Mattsson |
| 7,299,500 B1 | 11/2007 | Klebe et al. |
| 7,362,868 B2 | 4/2008 | Madoukh et al. |

(Continued)

FOREIGN PATENT DOCUMENTS

EP    1734719 A1    12/2006

OTHER PUBLICATIONS

IBM. Autonomous Cell-Level Database Encryption and Authentication. An IP.com Prior Art Database Technical Disclosure. IPCOM000153678D. Jun. 6, 2007. 10 pp.

(Continued)

*Primary Examiner* — John B King
(74) *Attorney, Agent, or Firm* — Mollborn Patents, Inc.; Fredrik Mollborn

(57) ABSTRACT

Methods for enhancing the security of content in a records management system. A document is received to be stored as a record in the records management system. A unique combination of an encryption key and encryption parameters is selected for the document. The encryption key and encryption parameters are stored on a server that is different from a server upon which the document is to be stored in the records management system. The document is encrypted using the selected unique combination of encryption key and encryption parameters. The encrypted document is stored in the records management system.

6 Claims, 4 Drawing Sheets

(56) References Cited

U.S. PATENT DOCUMENTS

| | | | |
|---|---|---|---|
| 7,904,732 B2 | 3/2011 | Cui et al. | |
| 7,921,284 B1* | 4/2011 | Kinghorn | G06F 21/6209 713/160 |
| 8,494,156 B2 | 7/2013 | Kleiner et al. | |
| 2004/0139211 A1 | 7/2004 | Baker et al. | |
| 2005/0244007 A1* | 11/2005 | Little | H04L 51/066 380/270 |
| 2006/0204003 A1* | 9/2006 | Takata | H04L 9/083 380/30 |
| 2007/0195960 A1* | 8/2007 | Goldman | H04L 9/30 380/286 |
| 2008/0170693 A1* | 7/2008 | Spies et al. | 380/277 |
| 2009/0086964 A1* | 4/2009 | Agrawal | G06F 21/10 380/44 |
| 2011/0145560 A1* | 6/2011 | Moon | H04N 21/234327 713/150 |
| 2011/0145593 A1* | 6/2011 | Auradkar | G06F 21/6218 713/189 |
| 2012/0066509 A1* | 3/2012 | Lapp | G06F 21/606 713/189 |
| 2013/0145160 A1 | 6/2013 | Bursell | |
| 2013/0246813 A1* | 9/2013 | Mori et al. | 713/193 |
| 2014/0013452 A1* | 1/2014 | Aissi | G06F 21/604 726/30 |
| 2014/0081949 A1* | 3/2014 | Kanawa | G06F 17/3046 707/715 |
| 2014/0164774 A1* | 6/2014 | Nord | G06F 21/602 713/171 |

OTHER PUBLICATIONS

USPTO U.S. Appl. No. 14/172,029 Office Action. Notification Date: Apr. 24, 2015.
USPTO U.S. Appl. No. 14/172,029 Final Office Action. Notification Date: Oct. 22, 2015.
USPTO U.S. Appl. No. 14/172,029 Office Action. Notification Date: Apr. 8, 2016.
USPTO U.S. Appl. No. 14/172,029 Office Action. Notification Date: Sep. 22, 2016.
USPTO U.S. Appl. No. 14/172,029 Office Action. Notification Date: Apr. 6, 2017.
U.S. Appl. No. 14/172,029 Office Action. Notification Date: Aug. 29, 2017.
U.S. Appl. No. 14/172,029 Office Action. Notification Date: Apr. 5, 2018.
U.S. Appl. No. 14/172,029 Office Action. Notification Date: Sep. 18, 2018.

* cited by examiner

DOCUMENT SECURITY IN ENTERPRISE CONTENT MANAGEMENT SYSTEMS

BACKGROUND

The present invention relates to Enterprise content Management (ECM) systems, and more specifically, to improving the security for documents stored in ECM systems. The security of electronic documents has become a predominant focus in recent days, as there has been increasing instances of hackers obtaining, for example, government classified documents and publishing them without permission on various websites, such as Wikileaks and others.

Most documents are secured through the use of a user interface that prevents users from seeing or uploading content to which they are not granted authorization, based on their level of classification authorizations. However, if the user can access the same document using a different application that does not follow the same rules, then the user can see whatever he wants, even if he is not supposed to have access to the content. For example, if the user has access to the source document through the server file system, then he can open the source document and read it, regardless of his official security level as defined by the official application used to manage access to the source document. This is how many of the most recent security breaches have occurred.

Some systems apply encryption through techniques like encryption hardware or encrypted file systems. These systems have the same encryption level for all documents they manage, and the same key is used for all documents. An Information Technology (IT) person can still easily access those files, and once one file has been successfully hacked, the entire disk is compromised. Storing content in a database can also help to limit access, but can still be easily bypassed by an IT person. Thus, improved techniques are needed for document security in ECM systems.

SUMMARY

According to one embodiment of the present invention, methods are provided, which implement and use techniques for enhancing the security of content in a records management system. A document is received to be stored as a record in the records management system. A unique combination of an encryption key and encryption parameters is selected for the document. The encryption key and encryption parameters are stored on a server that is different from a server upon which the document is to be stored in the records management system. The document is encrypted using the selected unique combination of encryption key and encryption parameters. The encrypted document is stored in the records management system.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
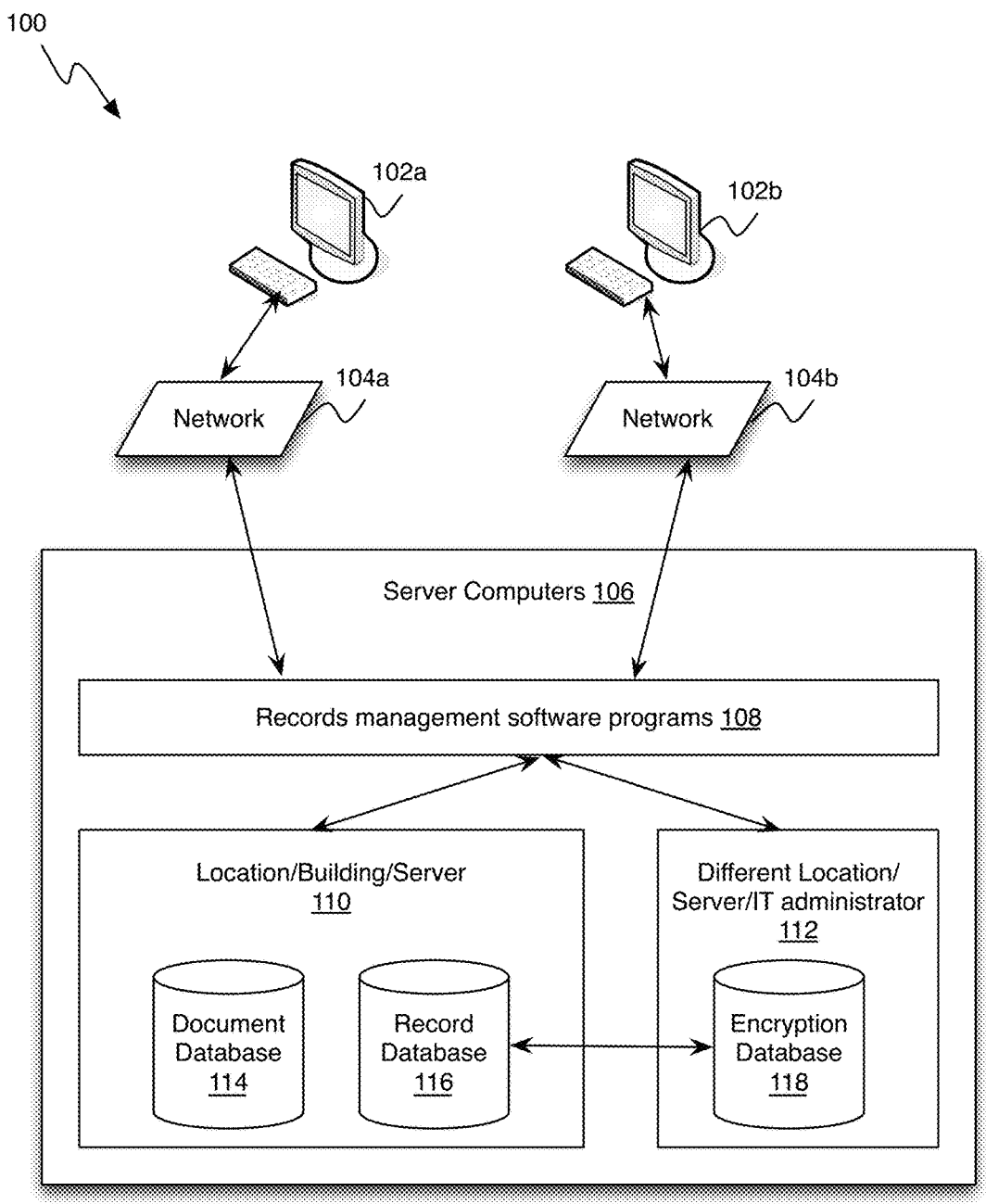
FIG. 1 shows a schematic view of a system in accordance with one embodiment of the invention.

The various embodiments of this invention secure the source content of a document in an ECM system through encryption, so that even if someone can access the file directly or through an alternate application, that person cannot read the content of the document.

In order to do so, various embodiments of the invention use a unique and different encryption key and parameters for each document, so that hacking one document will not allow a hacker to decrypt other documents in the ECM. Security is also improved by applying an administrator-specified encryption mechanism, and/or increasing the encryption level of documents, based on the document classification.

In some embodiments, in order to prevent a single person from having access to both the encrypted document and its key, the key database can be secured on a different server, which may be managed by a different IT team. Thus, getting access to one component only is not sufficient to read the source documents. Similarly, decrypting one document is not sufficient to decrypt any other document. Assuming that this architecture of separating the content from the key is implemented properly, only the RMS software can read the documents, and its inherent security prevents unauthorized access to the documents in the ECM system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

When adding a document to an ECM system, the document is stored based on the overall storage policy of the ECM software. When the document is declared as a record and is classified using RMS software, the RMS software encrypts the source document that is stored on the hard drive. The higher the classification level for the source document (e.g., "Classified"->"Secret"->"Top Secret"), the higher the encryption level. The encryption level can be increased, for example, by using a longer encryption key, a different key schedule, or different encryption algorithms. In one embodiment, each document is encrypted using a different encryption key and different encryption parameters, so that if a document is decrypted using "brute force" by a hacker, its key will be invalid for another document.

On the other hand, if a document is declassified, then its content does no longer need to be encrypted and the document can instead be stored under he default storage policy of the ECM.

In one embodiment, the encryption key and the encryption parameters are saved on a different server, using different security settings. In some cases, the server can be located at a different physical location. Thus, a person having access to the server where the source documents are saved will not have access to the server that holds the encryption keys.

When a classified document is viewed by a user using the RMS software, the document will be automatically decrypted. However, if the document were to be accessed using some kind of alternate mechanism, the document will be downloaded "as is" and viewed encrypted, which makes the document unreadable to a human reader.

Thus, even though these techniques may not present an "absolute security solution," they make it significantly more difficult and inconvenient for a single person to hack the documents stored in the ECM. Assuming that an organization can keep different IT personnel to manage the different parts of the security model described herein, that would require a more concerted solution by hackers to access and decrypt those documents.

FIG. 1 shows a schematic view of a system (100) in accordance with one embodiment of the invention. As can be seen in FIG. 1, two client computers (102a, 102b) are used to access the ECM server computers (106) over a network (104a, 104b). The client computers (102a, 102b) cannot access the content in the ECM directly, but use RMS software (108) in doing so.

The RMS software (108) can access a first location (110) and a second location (112). At the first location (110), there is a document database (114) and a record database (116). The document database (114) stores the encrypted documents and the record database (116) stores records corresponding to the encrypted documents. The record database (116) includes metadata related to the life cycle (such as the retention period) and classification level (such as, "declassified," "classified," "secret," etc.) of the document. The record database (116) communicates with an encryption key database (118) that is stored at the second location (112), in order to retrieve the encryption/decryption keys and encryption parameters that are used to encrypt/decrypt the documents in the document database (114). Encryption parameters are well known to those of ordinary skill in the art, and can include, for example, parameters such as the what encryption algorithm was used, what block cipher mode was used, and what key length was used, just to mention a few examples.

Figure 2:
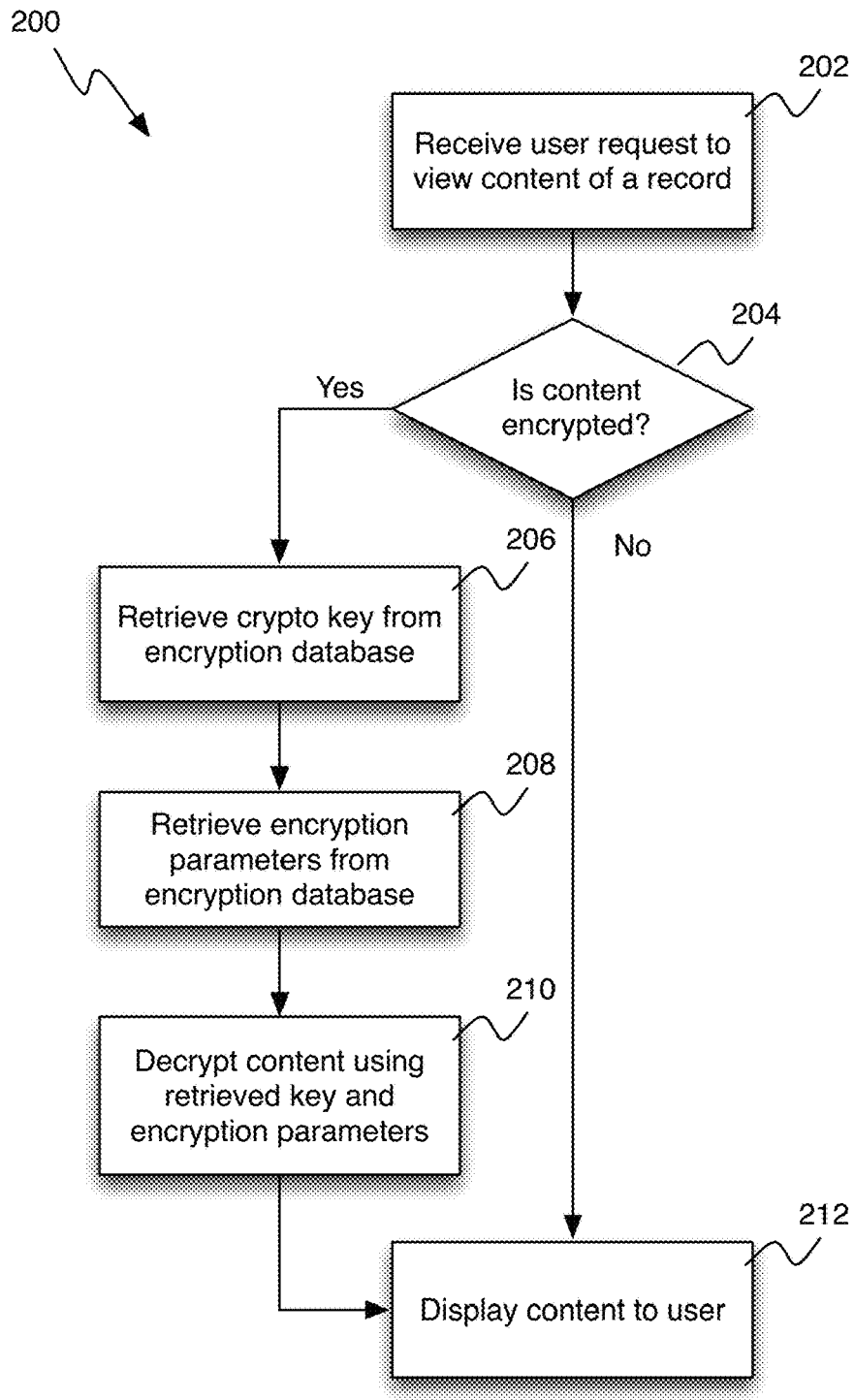
FIG. 2 shows a process for viewing a document in the document database in accordance with one embodiment of the invention.

FIG. 2 shows a process (200) for viewing a document in the document database (114) in accordance with one embodiment. As can be seen in FIG. 2, the process (200) starts by receiving a user request to view the contents of a record (step 202). The process then checks whether the content is encrypted (step 204). If the content is not encrypted, the content is displayed to the user (step 212), which ends the process (200).

If it is determined in step 204 that the content is encrypted, the RMS software (108) retrieves the key for the record from the encryption key database (118) (step 206). The RMS software (108) then retrieves the encryption parameters for the record from the encryption key database (118) (step 208). Next, the RMS software (108) uses the retrieved key and encryption parameters to decrypt the document (step 210), and finally, the content is displayed to the user (step 212), which ends the process (200).

Figure 3:
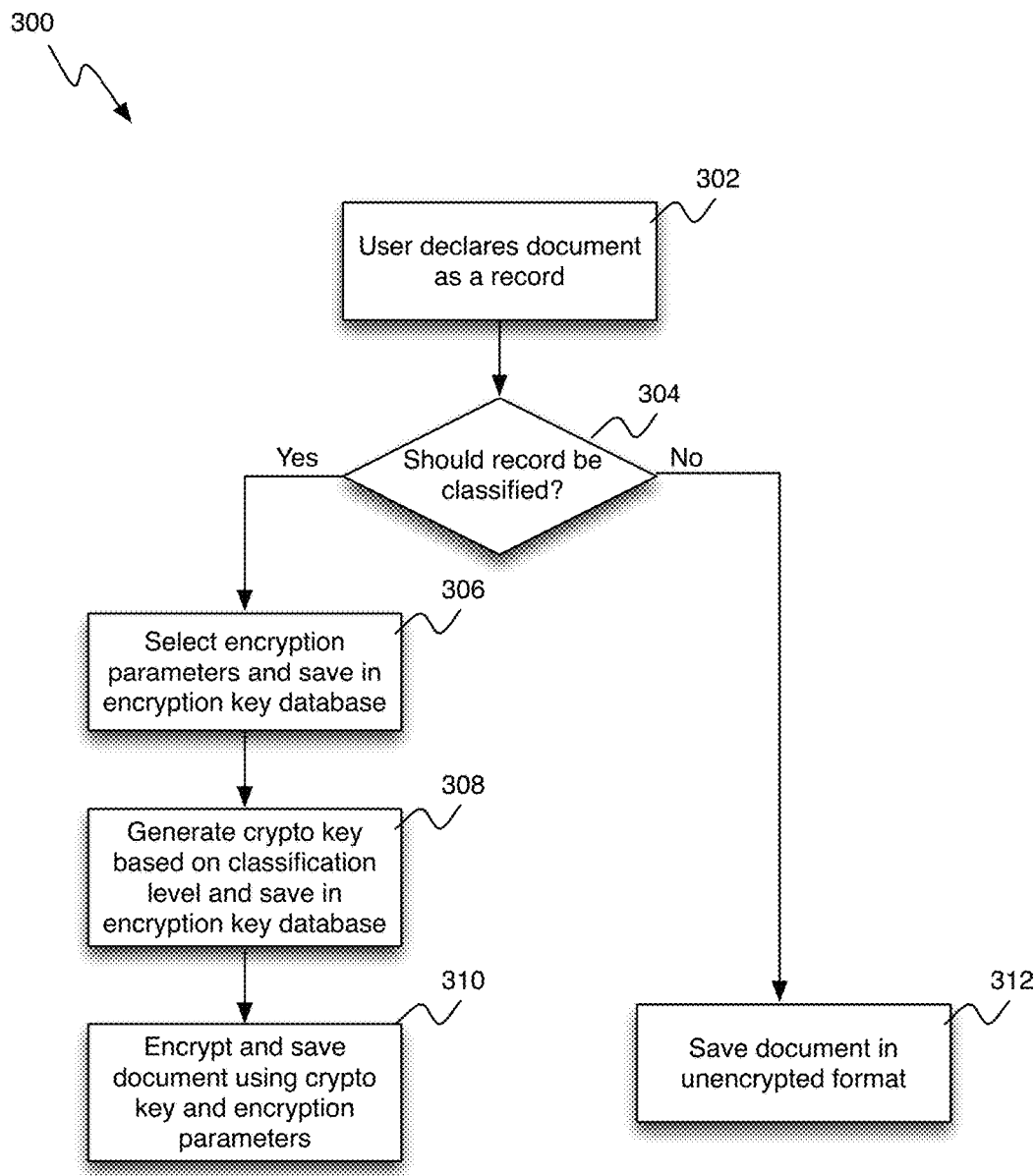
FIG. 3 shows a process for declaring a document as a record, in accordance with one embodiment of the invention.

FIG. 3 shows a process (300) for declaring a document as a record, in accordance with one embodiment. As can be seen in FIG. 3, the process (300) starts by a user declaring a document as a record (step 302). It is then examined whether the record should be classified (step 304). If the record is not a classified record, then the RMS software (108) saves the document in an unencrypted format in the document database server (114) (or file system) at the first location (110) (step 312), which ends the process (300).

If it is determined in step 304 that the record should be classified, the process continues to step 306 in which the RMS software (108) selects an appropriate encryption algorithm and saves the encryption parameters in the encryption key database (118). The RMS software (108) then generates an encryption key based on the record classification level encryption policy and saves the encryption key in the encryption key database (118) (step 308). Finally, the RMS software (108) encrypts the document corresponding to the record and saves the encrypted document in the document database (114) (step 310), which ends the process (300).

Figure 4:
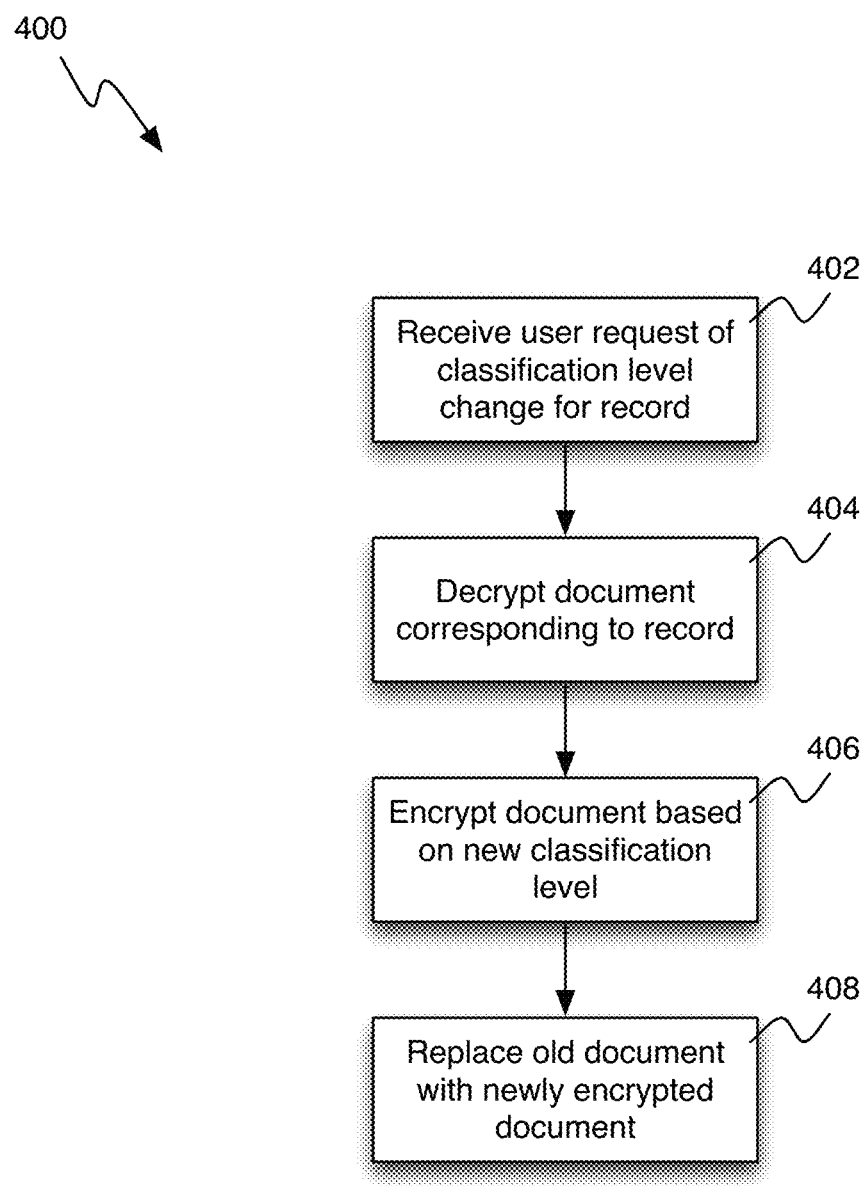
FIG. 4 shows a process for upgrading or downgrading a document classification level, in accordance with one embodiment.

FIG. 4 shows a process (400) for upgrading or downgrading a document classification level, in accordance with one embodiment. As can be seen in FIG. 4, the process (400) starts by receiving a user request to change the classification level for a record (step 402). The RMS software (108) then decrypts the document, as described above with reference to FIG. 2 (step 404). Next, the RMS software (108) encrypts the document based on the new classification level policy (or leaves the document unencrypted if it is to be declassified), as described above with reference to FIG. 3 (step 406). Finally, the RMS software (108) replaces the old document with the newly encrypted documents in the document database (114) (step 408), which ends the process (400).

While the various embodiments of the invention have been described above with respect to ECM systems, it should be realized that similar principles can be applied in other systems as well. For example, similar implementations could be done for other products in the solution spaces of Records Management, Document Management, and Web Content Management, just to mention a few examples. Accordingly, people of ordinary skill in the art can envision many alternative implementations that fall within the scope of the claims.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for a records management system, comprising:
   generating a unique encryption key for each document in a plurality of documents stored on a first server in a records management system, wherein each unique encryption key is generated in accordance with an assigned classification level for each document;
   encrypting each document in the plurality of documents at the first server, using the unique encryption keys for each document and a set of encryption parameters for each document; and
   storing the unique encryption keys and the sets of encryption parameters for each document on a second server.

2. The method of claim 1, wherein the first server and the second server are located in different physical locations.

3. The method of claim 1, further comprising:
   in response to receiving a user request to access a document in the plurality of documents stored on the first server:
      decrypting the document using the unique encryption key for the document; and
      providing access to the document.

4. The method of claim 1, wherein the encryption parameters include one or more of: an encryption algorithm, a block cipher mode, and a key length.

5. The method of claim 4, further comprising:
encrypting the document at the first server, using a different unique encryption key for the document and a different set of encryption parameters for the document; and
storing the different unique encryption key and the different set of encryption parameters for the document on the second server.

6. The method of claim 1, wherein the first server and the second server have different security settings and are managed by different administrators.

* * * * *